United States Patent
Hunter et al.

[11] Patent Number: 6,137,933
[45] Date of Patent: *Oct. 24, 2000

[54] INTEGRATED BI-DIRECTIONAL DUAL AXIAL GRADIENT REFRACTIVE INDEX/ DIFFRACTION GRATING WAVELENGTH DIVISION MULTIPLEXER

[75] Inventors: Boyd V. Hunter, Albuquerque; Robert K. Wade, Edgewood; Joseph R. Dempewolf, Albuquerque, all of N. Mex.; Ray T. Chen, Austin, Tex.

[73] Assignee: LightChip, Inc., Salem, N.H.

[*] Notice: This patent is subject to a terminal disclaimer.

[21] Appl. No.: 09/257,045

[22] Filed: Feb. 25, 1999

Related U.S. Application Data

[63] Continuation of application No. 08/990,199, Dec. 13, 1997, Pat. No. 5,999,672.

[51] Int. Cl.$^7$ ........................................................ G02B 6/34
[52] U.S. Cl. ............................................... 385/37; 385/24
[58] Field of Search .................................... 385/14, 24, 37, 385/46

[56] References Cited

U.S. PATENT DOCUMENTS

| | | | |
|---|---|---|---|
| 4,111,524 | 9/1978 | Tomlinson, III | 350/96.19 |
| 4,153,330 | 5/1979 | Tomlinson, III | 350/96.17 |
| 4,198,117 | 4/1980 | Kobayashi | 350/96.19 |
| 4,274,706 | 6/1981 | Tangonan | 350/96.19 |
| 4,279,464 | 7/1981 | Colombini | 350/96.19 |
| 4,299,488 | 11/1981 | Tomlinson, III | 359/328 |
| 4,343,532 | 8/1982 | Palmer | 350/96.19 |
| 4,387,955 | 6/1983 | Ludman et al. | 350/96.19 |

(List continued on next page.)

OTHER PUBLICATIONS

W.J. Tomlinson, "Wavelength multiplexing in multimode optical fibers", Applied Optics, vol. 16, No. 8, pp. 2180–2194 (Aug. 1977).

A.C. Livanos et al, "Chirped–grating demultiplexers in dielectric waveguides", Applied Physics Letters, vol. 30, No. 10, pp. 519–521 (May 15, 1977).

Hideki Ishio et al, "Review and status of wavelength–division multiplexing technology and its application", Journal of Lightwave Technology, vol. LT–2, No. 4, pp. 448–463 (Aug. 1984).

H. Obara et al, "Star coupler based WDM switch employing tunable devices with reduced tunability range", Electronics Letters, vol. 28 No. 13, pp. 268–270 (Jun. 18, 1992).

*Primary Examiner*—James W. Davie
*Attorney, Agent, or Firm*—Hunton & Williams

[57] ABSTRACT

A wavelength division multiplexer/demultiplexer is provided that integrates axial gradient refractive index elements with a diffraction grating to provide efficient coupling from a plurality of input optical sources (each delivering a single wavelength to the device) which are multiplexed to a single polychromatic beam for output to a single output optical source. The device comprises: (a) means for accepting an optical input from at least one optical source, the means including a planar surface; (b) a first coupler element comprising (1) a first axial gradient refractive index collimating lens having a planar entrance surface onto which the optical input is incident and (2) a first homogeneous index boot lens affixed to the first collimating lens and having a planar exit surface from which optical light exits; (c) a diffraction grating formed on the planar exit surface which combines a plurality of angularly separated diffracted wavelengths from the optical light; (d) a reflecting element for reflecting the plurality of diffracted wavelengths; (e) a second coupler element comprising (1) a second homogeneous index boot lens having a planar entrance surface onto which said plurality of diffracted wavelengths is incident and (2) a second axial gradient refractive index collimating lens affixed to the second homogeneous index boot lens; and (f) means for outputting at least one multiplexed, polychromatic output beam to an optical receiver, the means including a planar back surface. The device may be operated in either the forward or the reverse direction.

30 Claims, 16 Drawing Sheets

U.S. PATENT DOCUMENTS

| | | | |
|---|---|---|---|
| 4,479,697 | 10/1984 | Kapany et al. | 350/96.18 |
| 4,522,462 | 6/1985 | Large et al. | 350/96.19 |
| 4,583,820 | 4/1986 | Flamand et al. | 350/96.19 |
| 4,622,662 | 11/1986 | Laude et al. | 370/3 |
| 4,626,069 | 12/1986 | Dammann et al. | 350/162.2 |
| 4,634,215 | 1/1987 | Reule | 350/96.16 |
| 4,643,519 | 2/1987 | Bussard et al. | 350/96.19 |
| 4,652,080 | 3/1987 | Carter et al. | 350/96.19 |
| 4,671,607 | 6/1987 | Laude | 350/96.15 |
| 4,703,472 | 10/1987 | Blumentritt et al. | 370/3 |
| 4,708,425 | 11/1987 | Gouali et al. | 350/96.16 |
| 4,726,645 | 2/1988 | Yamashita et al. | 350/96.18 |
| 4,740,951 | 4/1988 | Lizet et al. | 370/3 |
| 4,741,588 | 5/1988 | Nicia et al. | 350/96.19 |
| 4,744,618 | 5/1988 | Mahlein | 350/96.19 |
| 4,746,186 | 5/1988 | Nicia | 350/96.13 |
| 4,748,614 | 5/1988 | Dammann et al. | 370/3 |
| 4,749,247 | 6/1988 | Large | 350/96.16 |
| 4,752,108 | 6/1988 | Vollmer | 350/96.12 |
| 4,760,569 | 7/1988 | Mahlein | 350/3 |
| 4,763,969 | 8/1988 | Khoe et al. | 350/96.19 |
| 4,773,063 | 9/1988 | Hunsperger et al. | 370/3 |
| 4,786,133 | 11/1988 | Gidon et al. | 350/96.19 |
| 4,819,224 | 4/1989 | Laude | 370/3 |
| 4,834,485 | 5/1989 | Lee | 350/96.19 |
| 4,836,634 | 6/1989 | Laude | 350/96.19 |
| 4,857,726 | 8/1989 | Kinney et al. | 250/226 |
| 4,923,271 | 5/1990 | Henry et al. | 350/96.19 |
| 4,926,412 | 5/1990 | Jannson et al. | 370/3 |
| 4,930,855 | 6/1990 | Clark et al. | 350/96.19 |
| 4,934,784 | 6/1990 | Kapany et al. | 350/96.18 |
| 5,026,131 | 6/1991 | Jannson et al. | 350/3.7 |
| 5,107,359 | 4/1992 | Ohuchida | 359/124 |
| 5,170,451 | 12/1992 | Ohshima | 385/43 |
| 5,228,103 | 7/1993 | Chen et al. | 385/14 |
| 5,278,687 | 1/1994 | Jannson et al. | 359/125 |
| 5,355,237 | 10/1994 | Lang et al. | 359/130 |
| 5,363,220 | 11/1994 | Kuwayama et al. | 359/3 |
| 5,440,416 | 8/1995 | Cohen et al. | 359/127 |
| 5,442,472 | 8/1995 | Skrobko | 359/110 |
| 5,450,510 | 9/1995 | Boord et al. | 385/37 |
| 5,457,573 | 10/1995 | Iida et al. | 359/569 |
| 5,500,910 | 3/1996 | Boudreau et al. | 385/24 |
| 5,513,289 | 4/1996 | Hosokawa et al. | 385/33 |
| 5,526,155 | 6/1996 | Knox et al. | 359/130 |
| 5,541,774 | 7/1996 | Blankenbecler | 359/653 |
| 5,555,334 | 9/1996 | Ohnishi et al. | 385/93 |
| 5,583,683 | 12/1996 | Scobey | 359/127 |
| 5,606,434 | 2/1997 | Feldman et al. | 359/3 |
| 5,657,406 | 8/1997 | Ball | 385/24 |
| 5,684,899 | 11/1997 | Ota | 385/37 |
| 5,703,722 | 12/1997 | Blankenbecler | 359/653 |
| 5,742,416 | 4/1998 | Mizrahi | 359/134 |
| 5,745,270 | 4/1998 | Koch | 359/124 |
| 5,745,271 | 4/1998 | Ford et al. | 359/130 |
| 5,745,612 | 4/1998 | Wang et al. | 385/24 |
| 5,748,350 | 5/1998 | Pan et al. | 359/130 |
| 5,748,815 | 5/1998 | Hamel et al. | 385/37 |
| 5,768,450 | 6/1998 | Bhagavatula | 385/24 |
| 5,777,763 | 7/1998 | Tomlinson, III | 359/130 |

OTHER PUBLICATIONS

A.E. Willner et al, "2–D WDM optical interconnections using multiple–wavelength VCSEL's for simultaneous and reconfigurable communication among many planes,", IEEE Photonics Technology Letters, vol. 5, No. 7, pp. 838–841 (Jul. 1993).

Yang–Tung Huang et al, "Wavelength–division–multiplexing and –demeltiplexing by using a substrate–mode grating pair", Optics Letters, vol. 17, No. 22, pp. 1629–1631 (Nov. 15, 1992).

M.R. Wang et al, "Five–channel polymer waveguide wavelength division demultilexer for the near infrared", IEEE Photonics Technology Letters, vol. 3, No. 1, pp. 36–38 (Jan. 1991).

Maggie M. Li et al, "Two–channel surface–normal wavelength division demultiplexer using substrate guided waves in conjunction with multiplexed waveguide holograms", Appl. Phys. Lett. vol. 66, No. 3, pp. 262–264 (Jan. 16, 1995).

G. R. Harrison, Ph.D., Sc.D. et al., Practical Spectroscopy, Chapter 4—Diffraction–Grating Spectrographs, Prentice–Hall (1948) (No Month).

W. J. Tomlinson, Wavelength multiplexing in multimode optical fibers, Applied Optics, vol. 16, No. 8 (Aug. 1977).

W. J. Tomlinson et al., Optical multiplexer for multimode fiber transmission systems, Appl. Phys. Lett., vol. 31, No. 3 (Aug. 1977).

W. J. Tomlinson et al., Optical wavelength–division multiplexer for the 1–1.4 $\mu$m spectral region, Electronics Letters, vol. 14, No. 11 (May 25, 1973).

T. Miki et al., Viabilities of the wavelength–division–multiplexing transmission system over an optical fiber cable, IEEE Transactions on Communications, vol. Com–26, No. 7 (Jul. 1978).

K. Aoyama et al., Optical demultiplexer for a wavelength division multiplexing system, Applied Optics, vol. 18, No. 8 (Apr. 15, 1979).

K. Aoyama et al., Low–loss optical demultiplexer for WDM systems in the 0.8–$\mu$m wavelength region, Applied Optics, vol. 18, No. 16 (Aug. 15, 1979).

R. Watanabe et al., Optical Demultiplexer Using Concave Grating in 0.7–0.9 um Wavelength Region, Electronics Letters, vol. 16, No.3 (Jan. 31, 1980).

K. Kobayashi et al., Microoptic Grating Multiplexers and Optical Isolators for Fiber–Optic Communications, Journal of Quantum Electronics, vol. QE–16, No. 1 (Jan. 1980).

Yohji Fujii et al., Optical Demultiplexer Using a Silison Echelette Grating, Journal of Quantum Electronics, vol. QE–16, No. 2 (Feb. 1980).

W. J. Tomlinson, Applications of GRIN–rod lenses in optical fiber communication systems, Applied Optics, vol. 19, No. 7 (Apr. 1, 1980).

A. Nicia, Wavelength Multiplexing and Demultiplexing Systems for Singlemode and Multimode Fibers, Conference Proceedings, European Conference on Optical Communication (Sep. 8–11, 1981).

B. D. Metcalf et al., High–capacity wavelength demultiplexer with a large–diameter GRIN rod lens, Applied Optics, vol. 21, No. 5 (Mar. 1, 1982).

J. Lipson et al., Low–Loss Wavelength Division Multiplexing (WDM) Devices for Single–Mode Systems, Journal of Lightwave Technology, vol. LT–1, No. 2 (Jun. 1983).

G. Winzer, Wavelength Multiplexing Components—A Review of Single–Mode Devices and their Applications, Journal of Lightwave Technology, vol. LT–2, No. 4 (Aug. 1984).

H. Ishio et al., Review and Status of Wavelength–Division–Multiplexing Technology and Its Application, Journal of Lightwave Technology, vol. LT–2, No. 4 (Aug. 1984).

Y. Fujii et al., Optical Demultiplexer Utilizing and Ebert Mounting Silicon Grating, Journal of Lightwave Technology, vol. LT–2, No. 5 (Oct. 1984).

J. Lipson et al., A Four–Channel Lightwave Subsystem Using Wavelength Division Multiplexing, IEEE Journal of Lightwave Technology, vol. LT–3, No. 1 (Feb. 1985).

B. Hillerich et al., Wide Passband Grating Multiplexer for Multimode Fibers, Journal of Lightwave Technology, vol. LT–3, No. 3 (Jun. 1985).

J. Lipson et al., A Six–Channel Wavelength Multiplexer and Demultiplexer for Single Mode Systems, Journal of Lightwave Technology, vol. LT–3, No. 5 (Oct. 1985).

I. Nishi et al., Broad Passband Multi/Demultiplexer for Multimode Fibers Using a Diffraction Grating and Retroreflectors, Journal of Lightwave Technology, vol. LT–5, No. 12 (Dec. 1987).

B. Moslehi et al., Fiber–optic wavelength–division multiplexing and demultiplexing using volume holographic gratings, Optics Letters, vol. 14, No. 19 (Oct. 1, 1989).

Y. Huang et al., Wavelength–division–multiplexing and – demultiplexing by using a substrate–mode grating pair, Optics Letters, vol. 17, No. 22 (Nov. 15, 1992).

M. Wu et al., Design Considerations for Rowland Circle Gratings Used in Photonic Integrated Devices for WDM Applications, Journal of Lightwave Technology, vol. 12, No. 11 (Nov. 1994).

A. Stavdas et al., Design of a holographic concave grating used as a multiplexer/demultiplexer in dense wavelength–routed optical networks with subnanometer channel spacing, Journal of Modern Optics, vol. 42, No. 9, pp. 1863–1874 (Sep. 1995).

C. Zhou et al., Four Channel Multimode Wavelength Division Demultiplexer (WDM) System Based on Surface–normal Volume Holographic Gratings and Substrate–guided Waves, SPIE, vol. 3288 (No Date).

A. Stavdas et al., Free–Space Aberration–Corrected Diffraction Grating Demultiplexer for Application in Densely–Spaced, Subnanometer Wavelength Routed Optical Networks, IEEE Electronic Letters, vol. 31, No. 16, pp. 1368–1370 (Aug. 1995).

D. Wisely, High performance 32 channel HDWDM multiplexer with 1nm channel spacing and 0.7nm bandwidth, SPIE, vol. 1578, Fiber Networks for Telephony and CATV (1991) (No Month).

A. Cohen et al., Active management of 100–GHz–spaced WDM channels, Optical Fiber Communication Conference and the International Conference on Integrated Optics and Optical Fiber Communication, Technical Digest, Conference Edition (Feb. 24, 1999).

B. Keyworth et al., Low Loss, Temperature Stable Diffraction Grating Wavelength (DE) Multiplexer, National Fiber Optic Engineers Conference, Technical Proceedings, vol. I (Sep. 13–17, 1998).

M. Seki et al., 20–Channel Micro–Optic Grating Demultiplexer for 1.1–1.6um Band Using a Small Focusing Parameter Graded–Index Rod Lens, Electronics Letters, vol. 18, No. 6 (Mar. 18, 1982).

A. Koonen, A Compact Wavelength Demultiplexer Using Both Interference Filters and a Diffraction Grating, European Conference of Optical Communication, Conference Proceedings (Sep. 8–11, 1981).

J. Conradi et al., Laser Based WDM Multichannel Video Transmission System, Electronic Letters, vol. 17, No. 2, (Jan. 22, 1981).

J. Laude et al., Wavelength division multiplexing/demultiplexing (WDM) using diffraction gratings, SPIE, vol. 503, Application, Theory, and Fabricationof Periodic Structures (1984) (No Month).

A. Livanos et al., Chirped–grating demultiplexers in dielectric waveguides, Applied Physics Letters, vol. 30, No. 10 (May 1977).

H. Obara et al., Star Coupler Based WDM Switch Employing Tunable Devices With Reduced Tunability Range, Electronic Letters, vol. 28, No. 13 (Jun. 1992).

A. Willner et al., 2–D WDM Optical Interconnections Using Multiple–Wavelength VCSEL's for Simultaneous and Reconfigurable Communication Among Many Planes, IEEE Phoyonics Technology Letters, vol. 5, No. 7 (Jul. 1993).

M. Wang et al., Five Channel Polymer Waveguide Wavelength Division Demultiplexer for the Near Infrared, IEEE Photonics Technology Letters, vol. 3, No. 1 (Jan. 1991).

M. Li et al., Two–channel surface–normal wavelength demultiplexer using substrate guided waves in conjunction with multiplexed waveguide holograms, Appl. Phys. Lett., vol. 66, No. 3 (Jan. 1995).

J. Laude et al., Stimax, A Grating Multiplexer for Monomode or Multimode Fibers, Ninth European Conference on Optical Communication–ECOC83, Geneva, Switzerland (Oct. 23–26, 1983).

INTEGRATED BI-DIRECTIONAL DUAL AXIAL GRADIENT REFRACTIVE INDEX/ DIFFRACTION GRATING WAVELENGTH DIVISION MULTIPLEXER

This application is a continuation of U.S. patent application Ser. No. 08/990,199, filed on Dec. 13, 1997, U.S. Pat. No. 5,999,672.

CROSS-REFERENCE TO RELATED APPLICATIONS

The present application is related to two other patent applications, the first entitled "Integrated Bi-Directional Gradient Refractive Index Wavelength Division Multiplex" Ser. No. 08/990,198, U.S. Pat. No. 6,011,885 and the second entitled "Integrated Bi-Directional Axial Gradient Refractive Index/Diffraction Grating Wavelength Division Multiplexer" Ser. No. 08/990,197, U.S. Pat. No. 6,011,884, both filed on even date herewith and assigned to the same assignee. This and the two related applications are all directed to wavelength division multiplexers, and differ in the presence or absence of a diffraction grating and the number of gradient refractive index elements.

TECHNICAL FIELD

The present invention relates generally to axial gradient lenses, and, more particularly, to axial gradient refractive index lenses employed in wavelength division multiplexer applications.

BACKGROUND ART

Wavelength division multiplexing (WDM) is a rapidly emerging technology that enables a very significant increase in the aggregate volume of data that can be transmitted over optical fibers. Traditionally, most optical fibers have been used to unidirectionally carry only a single data channel at one wavelength. The basic concept of WDM is to launch and retrieve multiple data channels in and out, respectively, from an optical fiber. Each data channel is transmitted at a unique wavelength, and the wavelengths are appropriately selected such that the channels do not interfere with each other, and the optical transmission losses of the fiber are low. Today, commercial WDM systems exist that allow transmission of 2 to 32 simultaneous channels.

WDM is a cost-effective method of increasing the volume of data (commonly termed bandwidth) transferred over optical fibers. Alternate competing technologies to increasing bandwidth include the burying of additional fiber optic cable or increasing the transmission speed on optical fiber. The burying of additional fiber optic cable costs on the order of $15,000 to $40,000 per Km. Increasing the optical transmission rate is increasing limited by speed and economy of the electronics surrounding the fiber optic system. One of the primary strategies to electronically increasing bandwidth has been to use time division multiplexing (TDM), which gangs or multiplexes multiple lower rate electronic data channels together into a single very high rate channel. This technology has for the past 20 years been very effective for increasing bandwidth; however, it is now increasingly difficult to improve transmission speeds, both from a technological and economical standpoint. WDM offers the potential of both an economical and technological solution to increasing bandwidth by using many parallel channels. WDM is complimentary to TDM, that is, WDM can allow many simultaneous high transmission rate TDM channels to be passed over a single optical fiber.

The use of WDM to increase bandwidth requires two basic devices that are conceptually symmetrical. The first device is a wavelength division multiplexer. This device takes multiple beams—each with discrete wavelengths and initially spatially separated in space—and provides a means of spatially combining all of the different wavelength beams into a single polychromatic beam suitable for launching into an optical fiber. The multiplexer may be a completely passive optical device or may include electronics that control or monitor the performance of the multiplexer. The input of the multiplexer is typically accomplished with optical fibers; however, laser diodes or other optical sources may be employed. The output of the multiplexer is typically an optical fiber.

Similarly, the second device for WDM is a wavelength division demultiplexer. This device is functionally the opposite of the multiplexer; it receives a polychromatic beam input from an optical fiber and provides a means of spatially separating the wavelengths. The output of the demultiplexer is typically interfaced to optical fibers or to photodetectors.

During the past 20 years, various types of WDMs have been proposed and demonstrated; see, e.g., (1) W. J. Tomlinson, *Applied Optics,* Vol. 16, No. 8, pp. 2180–2194 (August 1977); (2) A. C. Livanos et al, *Applied Physics Letters,* Vol. 30, No. 10, pp. 519–521 (May 15, 1977); (3) H. Ishio et al, *Journal of Lightwave Technology,* Vol. 2, No. 4, pp. 448–463 (August 1984); (4) H. Obara et al, *Electronics Letters,* Vol. 28, No. 13, pp. 1268–1270 (Jun. 18, 1992); (5) A. E. Willner et al, *IEEE Photonics Technology Letters,* Vol. 5, No. 7, pp. 838–841 (July 1993); and (6) Y. T. Huang et al, *Optics Letters,* Vol. 17, No. 22, pp. 1629–1631 (Nov. 15, 1992).

However, despite all of the above approaches, designs, and technologies, there remains a real need for a WDM device which possesses all the characteristics of: low cost, component integration, environment and thermal stability, low channel crosstalk, low channel signal loss, ease of interfacing, large number of channels, and narrow channel spacing.

DISCLOSURE OF INVENTION

In accordance with the present invention, a wavelength division multiplexer or demultiplexer combines axial gradient refractive index elements with a diffraction grating to provide an integrated, bi-directional wavelength division multiplexer or demultiplexer device. For simplicity, the multiplexer function will be extensively discussed; however, such discussions of the invention will also be directly applicable to the demultiplexer due to the symmetry of the multiplexer and demultiplexer function. The multiplexer device of the present invention comprises:

(a) a means for accepting a plurality of optical input beams of different wavelengths from optical fibers or other optical devices including lasers or laser diodes, the means including a planar front surface onto which the optical input light is incident and suitable for the connection of input optical fibers or integration of other devices;

(b) a first coupler subsystem comprising (1) a first axial gradient refractive index collimating lens operatively associated with the planar front surface and (2) a first homogeneous index boot lens affixed to the first axial gradient refractive index collimating lens and having a planar exit surface from which optical light beams exits;

(c) a diffraction grating formed or affixed at the planar exit surface of the first coupler optical subsystem which transforms a plurality of angularly separated wavelengths into a single polychromatic optical light beam;

(d) an optional reflecting element for reflecting the single polychromatic optical light beam to create a compact, optically folded device;

(e) an optional electrooptical element or elements for refracting the plurality of wavelengths to provide channel routing or switching capabilities;

(f) a second coupler subsystem comprising (1) a second homogeneous index boot lens having a planar front surface onto which the optical input light is incident and suitable for the connection of input optical fibers or other devices, (2) a second axial gradient refractive index collimating lens affixed to the second homogeneous index boot lens and (3) a planar back surface from which the optical light beam exits, operatively associated with the second homogeneous index boot lens;

(g) an optional beamsplitting passive or controllable mirror integrated within any of the homogeneous index boot lenses to provide a means for splitting the optical light beams into separate portions of the device for bi-directional multiplexing and demultiplexing capabilities; and (h) a means of outputting at least one multiplexed, polychromatic output beam to an optical receiver, the means including the planar back surface.

The device of the present invention may be operated in either the forward direction to provide a multiplexer function or in the reverse direction to provide a demultiplexer function. Further, the device of the present invention is inherently fully bi-directional and can be used simultaneously as a multiplexer and demultiplexer. For example, with integration of beamsplitting components, the device can be used as bi-directional multiplexer and demultiplexer for end nodes such as network hubs or intersections that distribute channel to various portions of the network.

The axial gradient refractive index and diffraction grating-based WDM devices of the present invention are unique because they contain one or more homogenous index boot lenses which allows integration of all the optical components into a single integrated device. This greatly increases the ruggedness, environmental and thermal stability while simultaneously avoiding the introduction of air spaces which cause increased alignment sensitivity, device packaging complexity, and cost.

Additionally, the homogeneous index boot lenses provide large, planar surfaces for device assembly, alignment and the integration of additional device functions. The use of an axial gradient refractive index lens allows very high performance imaging from a lens with traditional spherical surfaces, thereby providing the diffraction-limited optical imaging necessary for WDM applications. Further, axial gradient refractive index lenses are formed with high quality and low cost. Alternately, aspheric shaped lenses could be used in place of axial gradient refractive index lenses; however, the collimating performance is the same, but it is exceedingly difficult to create a one-piece, integrated device with aspheric surfaces. Further, aspherical lenses are typically very costly and suffer from ghosting-types of reflections which are very undesirable.

The integration of the WDM device allows for a compact, robust, and environmentally and thermally stable system. In particular, integration of the components into a solid block maintains component alignment, which provides long-term performance in contrast to non-integrated air-spaced devices that characteristically degrade in alignment and therefore performance over time.

Overall, the present invention features a novel approach to WDM. The use of optical lenses in conjunction with a diffraction grating allows all wavelengths to be multiplexed simultaneously and treated uniformly. This is in contrast to the less desirable serial WDM approaches that use interference filter-based or fiber Bragg gratings. Such serial WDM approaches suffer from significant optical loss, crosstalk, alignment, and temperature issues. Further, compared to other parallel multiplexing approaches such as array waveguide grating devices, fused fiber couplers, or tree waveguide couplers, the present invention performs the wavelength separation freely inside glass as opposed to inside of lossy waveguiding structures. Thus, the present invention has the distinct advantages of lower optical signal loss through the device and ease of assembly and alignment compared to the current art.

Other objects, features, and advantages of the present invention will become apparent upon consideration of the following detailed description and accompanying drawings, in which like reference designations represent like features throughout the FIGURES. It will be apparent to one skilled in the art that additional objects, features, and advantages not expressly discussed here are inherent to and follow from the spirit of this invention.

BRIEF DESCRIPTION OF THE DRAWINGS

The drawings referred to in this description should be understood as not being drawn to scale except if specifically noted.

FIG. 1a is a perspective view of the input portion of the device of FIG. 1 and illustrates an alternate input configuration in which the input is an array of laser diodes;

FIG. 1b is a perspective view of the output portion of the device of FIG. 1 and illustrates an alternate output configuration for a demultiplexer device in which the output is an array of photodetectors;

BEST MODES FOR CARRYING OUT THE INVENTION

Reference is now made in detail to specific embodiments of the present invention, which illustrate the best modes presently contemplated by the inventors for practicing the invention. Alternative embodiments are also briefly described as applicable.

Figure 1:
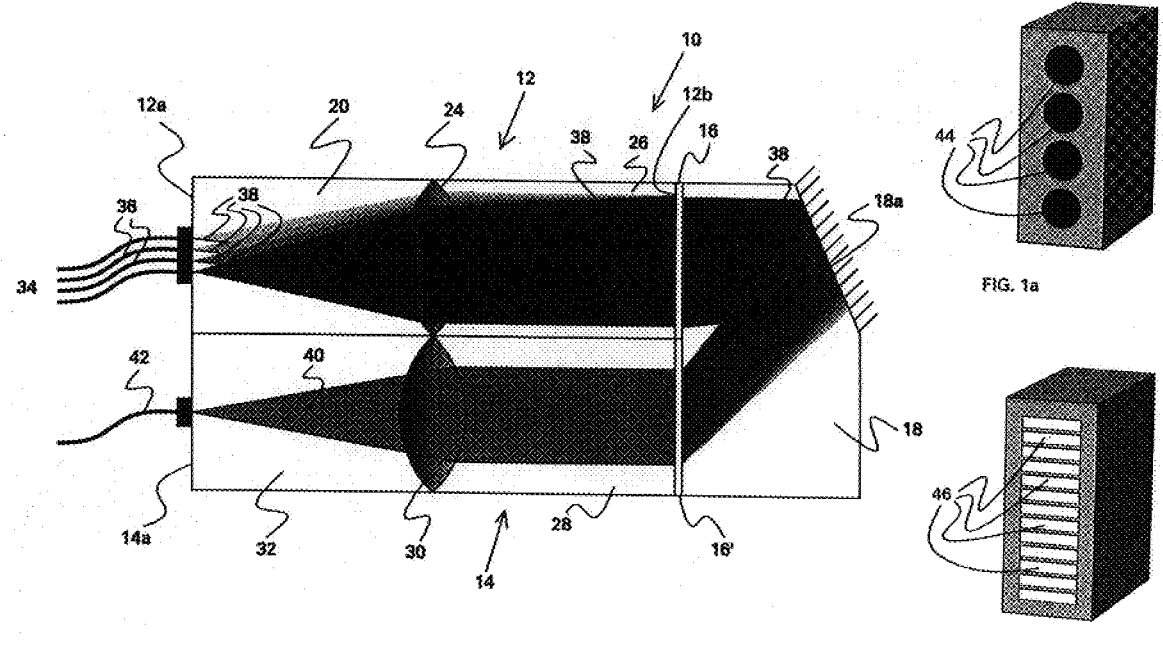
FIG. 1 is a side elevational view of a wavelength division multiplexer device of the present invention, with a transmissive diffraction grating and multiple optical fiber inputs multiplexed to one optical fiber output, it being noted that the device may be operated in the reverse direction as a wavelength division demultiplexer with a single optical fiber input demultiplexed to an array of optical fibers.

FIG. 1 depicts a preferred embodiment of the present invention, which embodies an axial gradient refractive index of refraction/diffraction grating wavelength division multiplexer device. This device contains a folded optical path to decrease the overall length of the device, enable ease of construction and alignment, and increase ruggedness and stability during operation.

The device 10 comprises two coupler elements 12, 14; on the exit surface of the first coupler element 12 is placed an optical spacer 16. Adjacent to the optional spacer 16 is a mirror element 18 having a mirrored surface 18a that reflects light toward a diffraction grating 16', which is placed between the mirror element 18 and the second coupler element 14. The optional spacer 16 merely maintains the spacing between the two coupler elements 12, 14 and the mirror element 18. First coupler element 12 comprises a first homogeneous index boot lens 20 joined or affixed to a first axial gradient refractive index collimating lens 24. The first axial gradient refractive index lens 24 in turn is joined or affixed to a second homogeneous index boot lens 26. The joining or affixing is accomplished using an optical cement. Second coupler element 14 comprises a third homogeneous index boot lens 28 joined or affixed to a second axial gradient refractive index collimating lens 30, in turn joined or affixed to a fourth homogeneous index boot lens 32; again, joining is also conveniently done using an optical cement.

In this first embodiment, an array 34 of optical fibers 36 are positioned so that light emanating from the end the optical fibers is incident on the entrance surface 12a of the first coupler element 12. Each fiber 36 provides a light beam 38 with a discrete wavelength. The plurality of spatially separated light beams 38 enters the first homogeneous index boot lens 20, where they are expanded in diameter. Subsequently, the plurality of light beams 38 enters the first axial gradient refractive index lens 24, where they are collimated and then pass through the second homogeneous index boot lens 26. The collimated light then passes through the optional spacer 16, into the mirror element 18, and then through the diffraction grating 16', which removes the spatial and angular separation within the plurality of light beams and creates a single light beam 40 containing within itself a plurality of wavelengths. The single light beam 40 then passes through the second coupling element 14 (first, through the third homogeneous index boot lens 28, then through the second axial gradient refractive index focusing lens 30, and finally the fourth homogeneous index boot lens 32). The single focused beam 40 is then incident on an optical fiber 42, attached at the exit surface 14a of the second coupler element 14. The two surfaces 12a and 14a are coplanar.

In the mirror element 18, the reflective surface 18a is formed on a beveled edge, formed at an angle of 22.5°. This angle of 22.5° arises from the use of a diffraction grating 16' that provides a center wavelength diffracted angle of 45° from the incident angle. Other grating diffraction angles may also be used; however, in such event, the mirror angle is one-half of the diffracted angle. Wavelengths longer or shorter than the center wavelength will diffract at slightly larger or smaller angles, respectively, and are determined by the well-known formula:

$$m\lambda = d(\sin \alpha + \sin \beta)$$

where m is the diffraction order, $\lambda$ is the wavelength, d is the diffraction grating groove spacing, $\alpha$ is the incident angle with respect to the grating, and $\beta$ is the diffracted angle with respect to the grating.

The device 10 of the first embodiment takes an input fiber array 34 of N discrete wavelengths of light and spatially combines them into a single fiber 42 output. Each wavelength is transmitting information superimposed on it by other means, which are not shown here and which do not form a part of this invention, but are well known in this art.

The diffraction grating 16' is formed at the entry surface of the second coupler element 14. It may be formed by a variety of techniques, such as a three-dimensional hologram in a polymer medium, which can be attached to the entry surface, such as with an optical cement. Alternatively, the diffraction grating 16 may be ruled on the entry surface by a mechanical ruling engine or by other techniques that are well known in this art. The ruled diffraction grating 16' could be formed directly on the entry surface or formed in a separate planar material such as polymer, glass, silicon, etc. that is secured to the beginning of the second coupler element 14, again by an optical cement. The spacer 16 merely provides the same spacing as the diffraction grating 16' to ensure that the various parts of the multiplexer 10 remain in alignment.

In the embodiment depicted in FIG. 1, a plurality of laser diodes 44, shown in FIG. 1a, may be used in place of a plurality of optical fibers to provide optical beam inputs for the wavelength division multiplexer. The array of laser diodes may either be butt-coupled to the WDM device 10, may be longitudinally separated, or may have appropriate lenses placed between the array to provide the lowest amount of coupling loss or crosstalk.

In the second embodiment, the device 10 shown in FIG. 1, as with all of the devices described herein, may be operated in the converse configuration, with a single optical fiber input 42 that introduces a single polychromatic light beam carrying multiple discrete wavelength channels. The channels are spatially separated by the demultiplexing function of the device for output to a plurality of optical fibers 36. Each output fiber carries only a single and discrete wavelength channel. Functionally, in this embodiment, the demultiplexer provides an identical but opposite function to the multiplexer device 10 described in FIG. 1.

In the demultiplexer embodiment, a plurality of photodetectors 46, shown in FIG. 1b, may be used in place of the plurality of optical fibers 36 to provide optical beam outputs for the wavelength division demultiplexer. The array of photodetectors 46 may either be butt-coupled to the WDM device 10, may be longitudinally separated, or may have appropriate focusing lenses placed between the array to provide the lowest amount of coupling loss or crosstalk.

The coupling to the device 10 of optical fibers 36, as shown in FIG. 1, and arrays of laser diodes 44, as shown in FIG. 1a, or of arrays of photodetectors 46, as shown in FIG. 1b, employs couplers or interconnects that are well known in the art and do not form a part of this invention.

Figure 2:
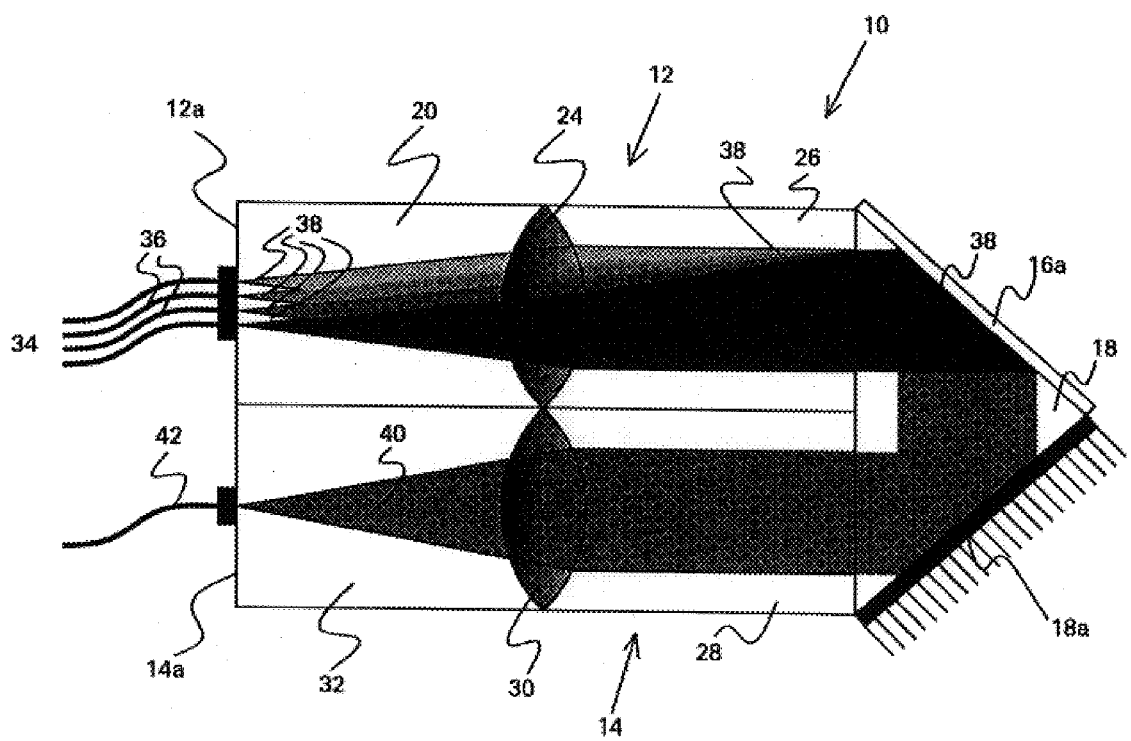
FIG. 2 is a view similar to the device of FIG. 1, but contains a reflective diffraction grating instead of a transmissive diffraction grating.

In a third embodiment, the device 10 shown in FIG. 1, as with all of the devices described herein, may be constructed with a reflective diffraction grating 16a in place of a transmissive diffraction grating 16'. The angles of the reflective diffraction grating 16a and the reflecting element mirror 18 must be selected such that the folding of the device 10 such as in FIG. 1 is achieved. For example, in FIG. 2, the transmissive diffraction grating 16' is replaced with a reflective transmission grating 16a that is located at the first back surface of the reflecting element 18 at an angle of 45° to the axis of the first collimating lens assembly 12. Similarly, the mirrored reflective surface 18a is at a 315° angle to the first collimating lens assembly 14. In this configuration, the reflective diffraction grating 16a, the mirrored surface 18a, and the shape of the glass reflective element 18 provide a well-known Porro-type of prism arrangement; however, other reflecting angles may be very useful. It should be understood that this embodiment with the Porro-type prism arrangement is desirable in that it does not contribute anamorphic magnification of the light beams in the system in the plane perpendicular to the plane of the grating and the ruled grating direction. Further, the need for a spacer 16 is eliminated.

Figure 3:
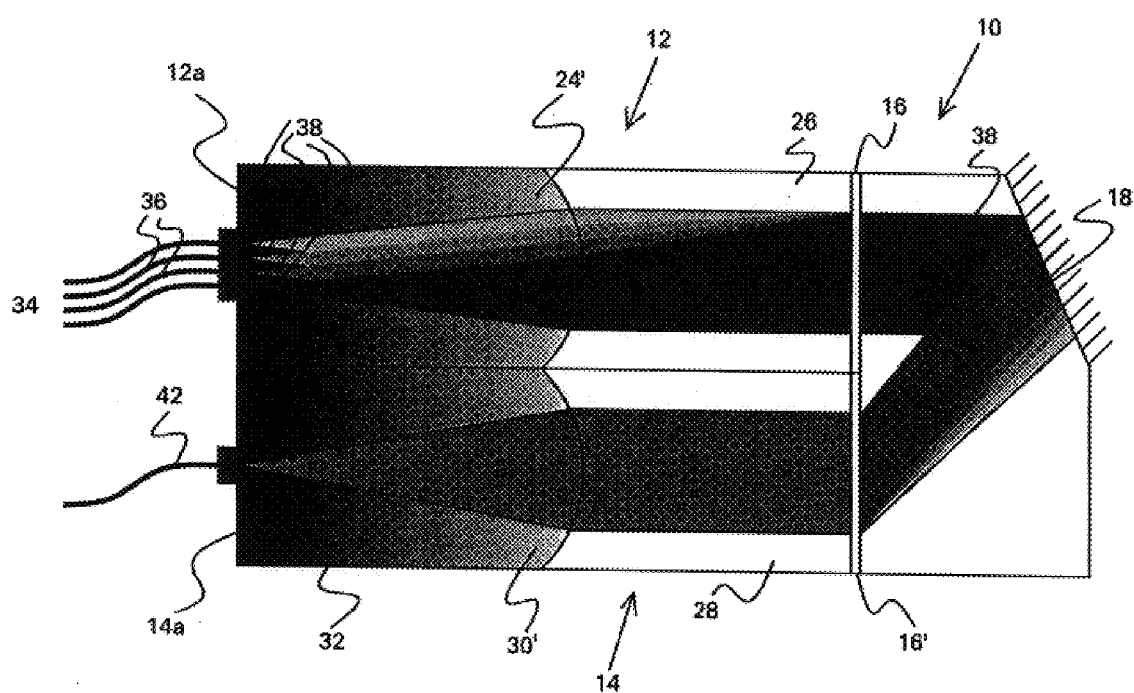
FIG. 3 is a view similar to the device of FIG. 1, but does not include homogeneous index boot lens elements between the input and the first axial gradient refractive index collimating lens and between the second axial gradient refractive index collimating lens and the output.

In a fourth embodiment, depicted in FIG. 3, the homogeneous elements 20 and 32 in FIG. 1 are removed to create a more compact device or for multiplexing devices where the use of the homogeneous index boot lenses are not necessary for performance. In this embodiment, the first axial gradient refractive index lens 24' possesses a planar entrance face 12a for directly connecting to a plurality of optical fibers 36 or laser diodes 44 and the second axial gradient refractive index lens 30' possesses a planar exit face 14a for directly connecting to a single output fiber 42. An alternate implementation (not shown) of this fourth embodiment would be to incorporate an air space between the input plurality of fibers 36 or laser diodes 44 and the first axial gradient refractive index lens 24', and between the second axial gradient refractive index lens 30' and the output fiber connector 42. The introduction of air space is not a preferred embodiment, as it increases the complexity of assembly and alignment of the multiplexer device and would be subject to greater environmental and temperature instability versus the integrated block approach of the previous embodiments. All elements are secured together with the use of optical cement.

Figure 4:
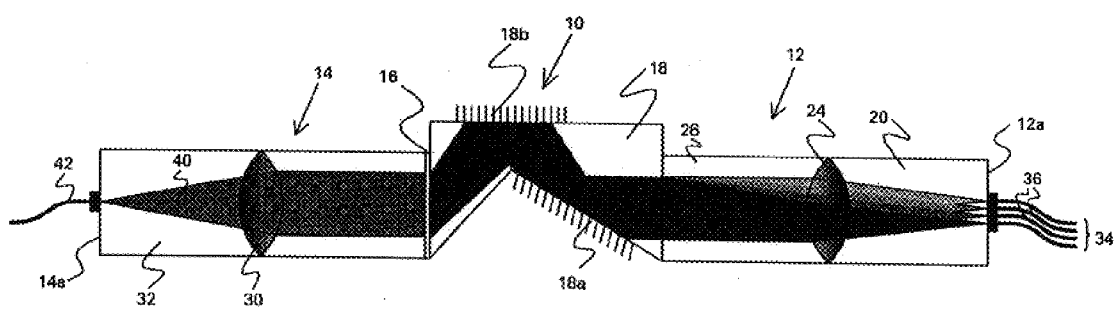
FIG. 4 is a view similar to the device of FIG. 1, but contains a reflecting element with multiple mirrors in order to create an in-line device.

In a fifth embodiment, depicted in FIG. 4, the wavelength division multiplexer may be arranged without the folded geometry of the first embodiment (as shown in FIG. 1). Without any folding of the optical path, a linear or in-line device is created. This device has all of the same features as the first embodiment except for the compactness of the design. That is, the fifth embodiment is longer in one dimension and requires a more complex reflecting element 18. As shown in FIG. 4, the reflecting element 18 requires at least two mirrors 18a, 18b to return the light beams back into an in-line direction. This is not the most preferred embodiment, due to the long length of this unfolded device; however, this embodiment may be preferred where the length of the device is not a disadvantage, but where the decreased height of the device is desirable.

Figure 5:
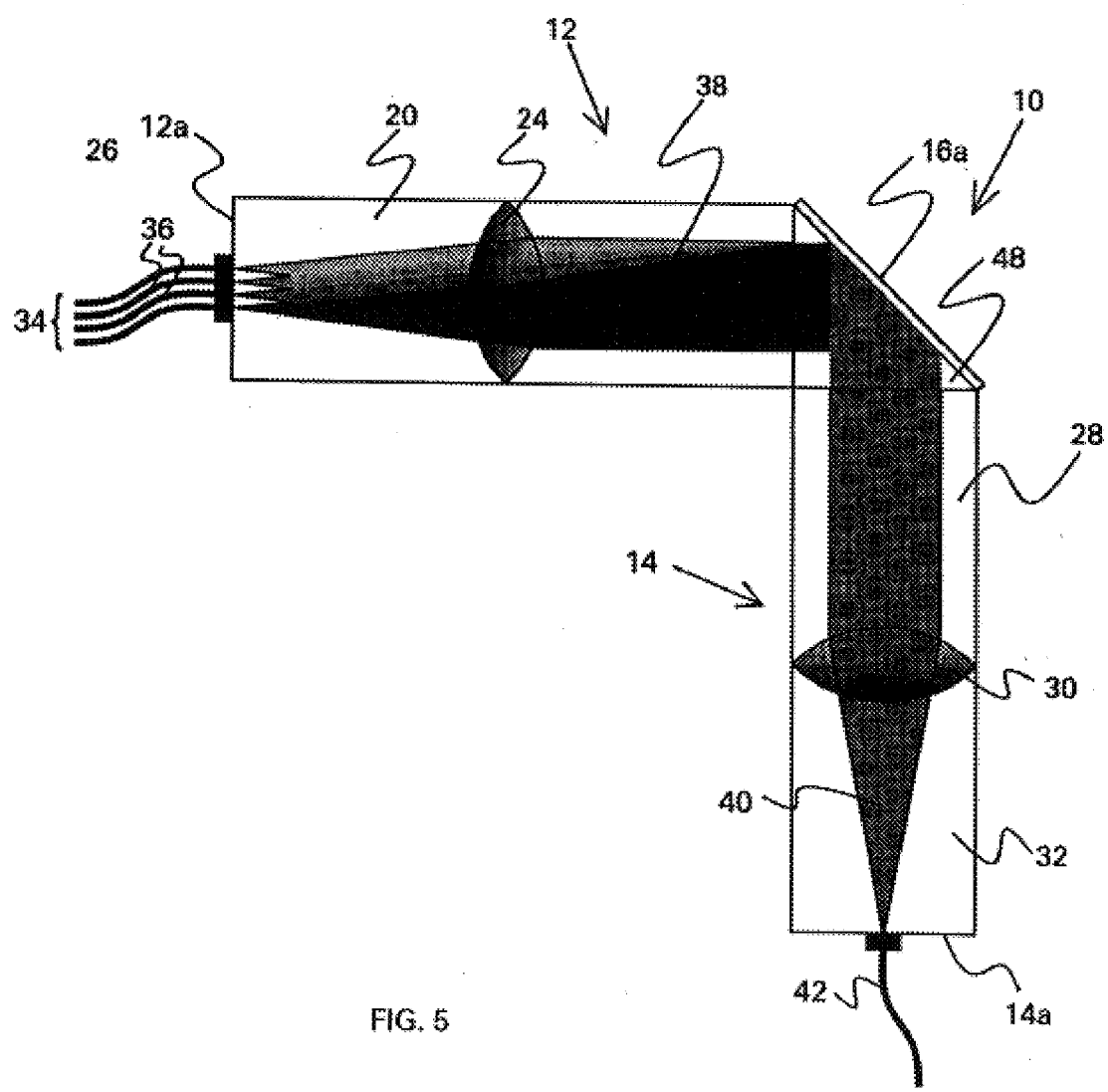
FIG. 5 is a view similar to the device of FIG. 1, but contains a reflective diffraction grating and no reflecting element appropriate to creating an "L" shaped device.

In a sixth embodiment, depicted in FIG. 5, the wavelength division multiplexer 10 may be arranged without the folded geometry of the first embodiment (as shown in FIG. 1) by eliminating the reflecting element 18. Instead, a transmissive portion 48 of glass or air is used between the diffraction grating 16a and the second collimating lens assembly 14. As shown in FIG. 5, the current embodiment can be used to create a "L"-shaped device which does not contain a reflective mirror component 18. This embodiment is not preferred as it lacks compactness; that is, it has a greater length and height and requires a more complex placement of the transmissive or reflective diffraction grating 16a and of the reflecting element. However, it will be appreciated by those skilled in the art that the angle between the two coupler elements 12 and 14 need not be 90° as shown in FIG. 5, but may be either acute or obtuse.

Figure 6:
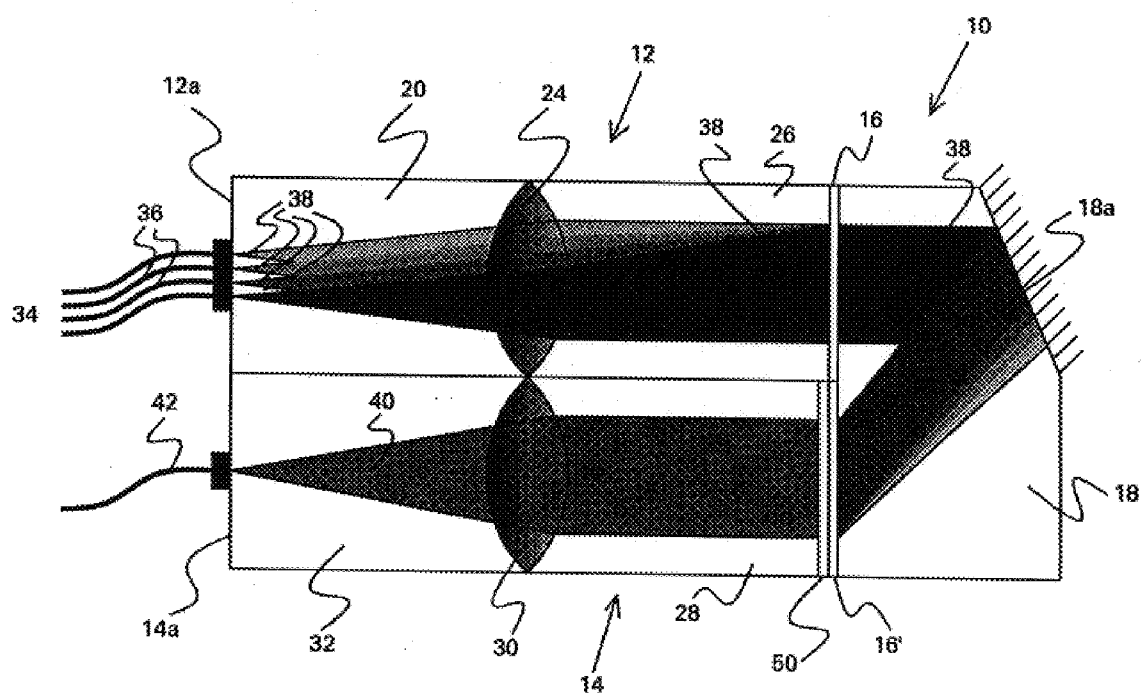
FIG. 6 is a view similar to the device of FIG. 1, but contains an electrooptical beamsteering element between the reflecting element and the second coupler subsystems to provide a channel routing function by shifting the position of the output beam at the output face of the device.

In the seventh embodiment, shown in FIG. 6, a non-linear electrooptic element 50 is integrated to provide a capability for selectively routing the multiplexed light to one of several possible colinear fiber outputs. This is exceedingly valuable for optical networking, whereas the wavelength division multiplexer device can provide simultaneously integrated multiplexing and routing functions. The electrooptic element 50 is an electrically controlled optical material in which the refractive index can be modified by varying the electrical current applied to the material. Such electrooptic elements 50 are well-known; examples include lithium niobate, liquid crystals, and other non-linear electrooptic materials.

Figure 6A:
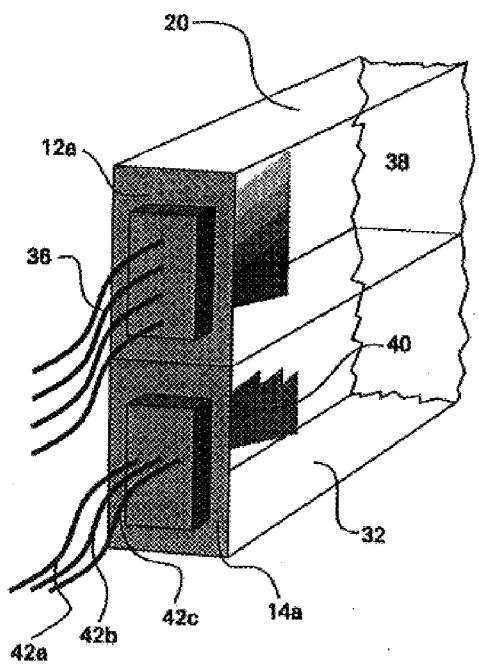
FIG. 6a is a perspective view of the input/output portion of the device of FIG. 6, showing a one-dimensional array of inputs and multiple co-linear outputs.

The change in refractive index is used to increase or decrease the angle of light propagation (relative to the gradient direction of the electrooptical material). At the output face 14a of the device 10, the deflection angle is transformed into a spatially colinear deflection of the beam. It is very desirable to use the electrooptic element 50 to shift the position of the light beam output to more than one output fiber 42. As shown in FIG. 6, the electrooptical element 50 is used to direct the output to one of a plurality of possible fiber outputs 42. The output optical fibers 42a, 42b, and 42c are colinear, as shown in FIG. 6a.

Figure 6B:
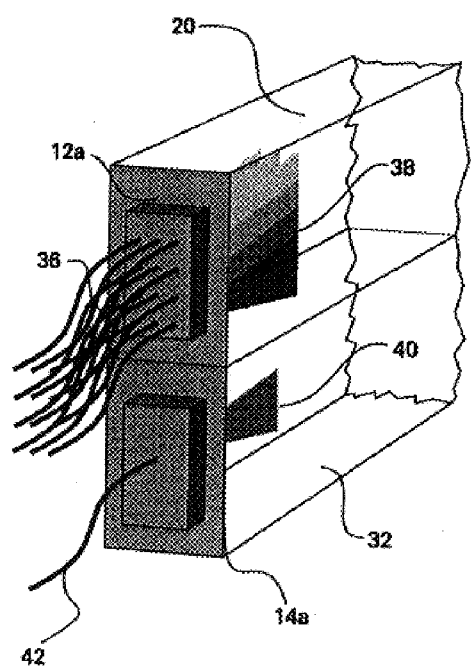
FIG. 6b is similar to that of FIG. 6a, but showing a two-dimensional array of inputs and a single output.

An alternate embodiment would use the device in the reverse direction to create a demultiplexing and routing device. The preferred orientation of the electrooptical element is such that the spatial variation at the output face 12a of the device 10 is in a line perpendicular to both the ruling direction and plane of the diffraction grating 16'. In this alternate embodiment, the demultiplexed outputs may be routed to one of many possible output arrays of fibers 36 as shown in FIG. 6b. Alternately, the demultiplexed outputs may be routed to one of many possible arrays of photodetectors, such as shown in FIG. 1b. The resulting output array (whether optical fibers or photodetectors) is a two-dimensional array, as opposed to the one-dimensional array of FIGS. 1, 1a, and 1b. This configuration saves in the cost and size by integrating the demultiplexing (or multiplexing) function together with a routing function.

Figure 7:
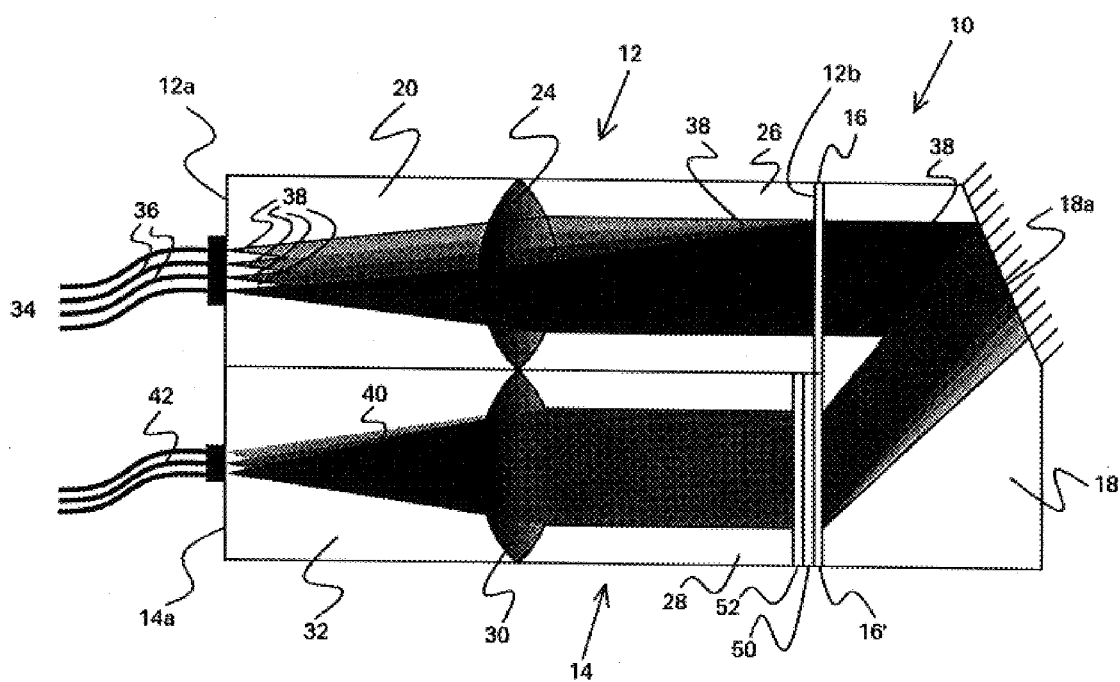
FIG. 7 is a view similar to the device of FIG. 1, but contains two electrooptical beamsteering elements between the reflecting element and the second coupler subsystems, in which the electrooptical elements are orthogonal to one another, which enables a channel routing function by shifting channels within a plane parallel to the diffraction grating.
Figure 8:
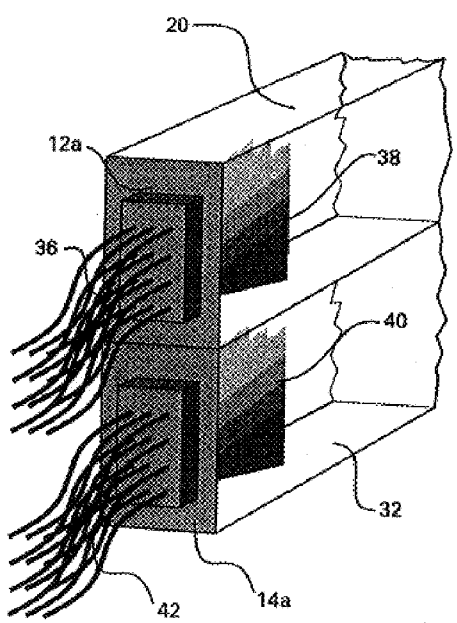
FIG. 8 is a perspective view of a portion of the device of FIG. 1, but including a two-dimensional array of input optical fibers that independently output to a two-dimensional array to provide simultaneous integrated multiplexing and routing functions.

In an eighth embodiment, depicted in FIG. 7, two perpendicularly oriented non-linear electrooptic elements 50, 52 are integrated to provide a capability for selectively routing the multiplexed light 40 into one of several possible linear output fibers 42. For example, in the multiplexer function, either a one-dimensional or two-dimensional input array may be outputted to a two-dimensional array (such as shown in FIG. 6a), and in the demultiplexer function, a single fiber input may be outputted to various portions of a two-dimensional array via switching (such as shown in FIG. 6b). This is exceedingly valuable for optical networking, whereas the wavelength division multiplexer device 10 can provide simultaneous integrated multiplexing and routing functions to a two-dimensional output array, as shown in FIG. 8.

It will be apparent to one skilled in the art that the exact placement of the electrooptical elements 50, 52 may be varied to improve the performance, such as the routing function of the device 10. For example, an alternative embodiment (not shown) would place the electrooptical element 50 or elements 50, 52 between the input fibers 36 and the planar input face 12a of the device 10. Further, it will be noted that placing the electrooptical element(s) 50, 52 at the input face 12a of the device 10 enables an array or multiple arrays of individually controllable electrooptical elements to be used to separately direct each beam 38. This would provide a very powerful wavelength routing function.

Figure 9:
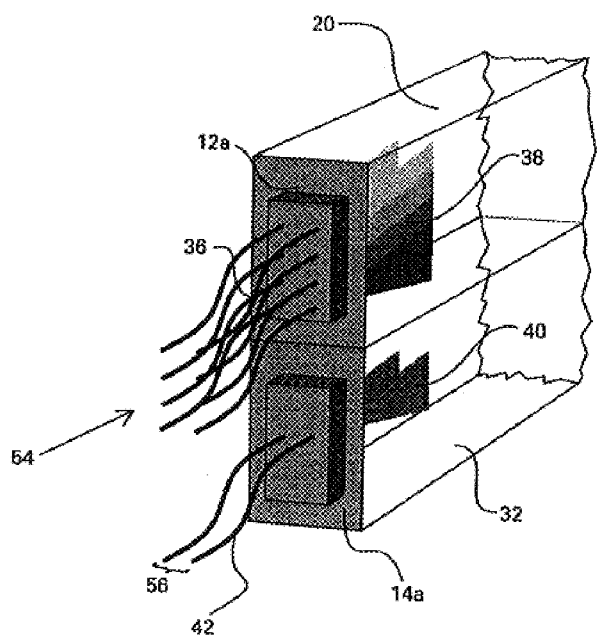
FIG. 9 is a perspective view of a portion of the device of FIG. 1, but including a two-dimensional array of input optical fibers that independently output to a one-dimensional fiber array perpendicular to the two-dimensional input array.

In the ninth embodiment, shown in FIG. 9, the wavelength division multiplexer is designed to input a two-dimensional array 54 of input optical fibers 36, with a one-dimensional output 56. The purpose of this embodiment is to provide the ability to simultaneously multiplex multiple fiber arrays in parallel within one single multiplexer device. This embodiment saves cost and size, and integrates the function of several one-dimensional systems into one two-dimensional system.

Figure 10:
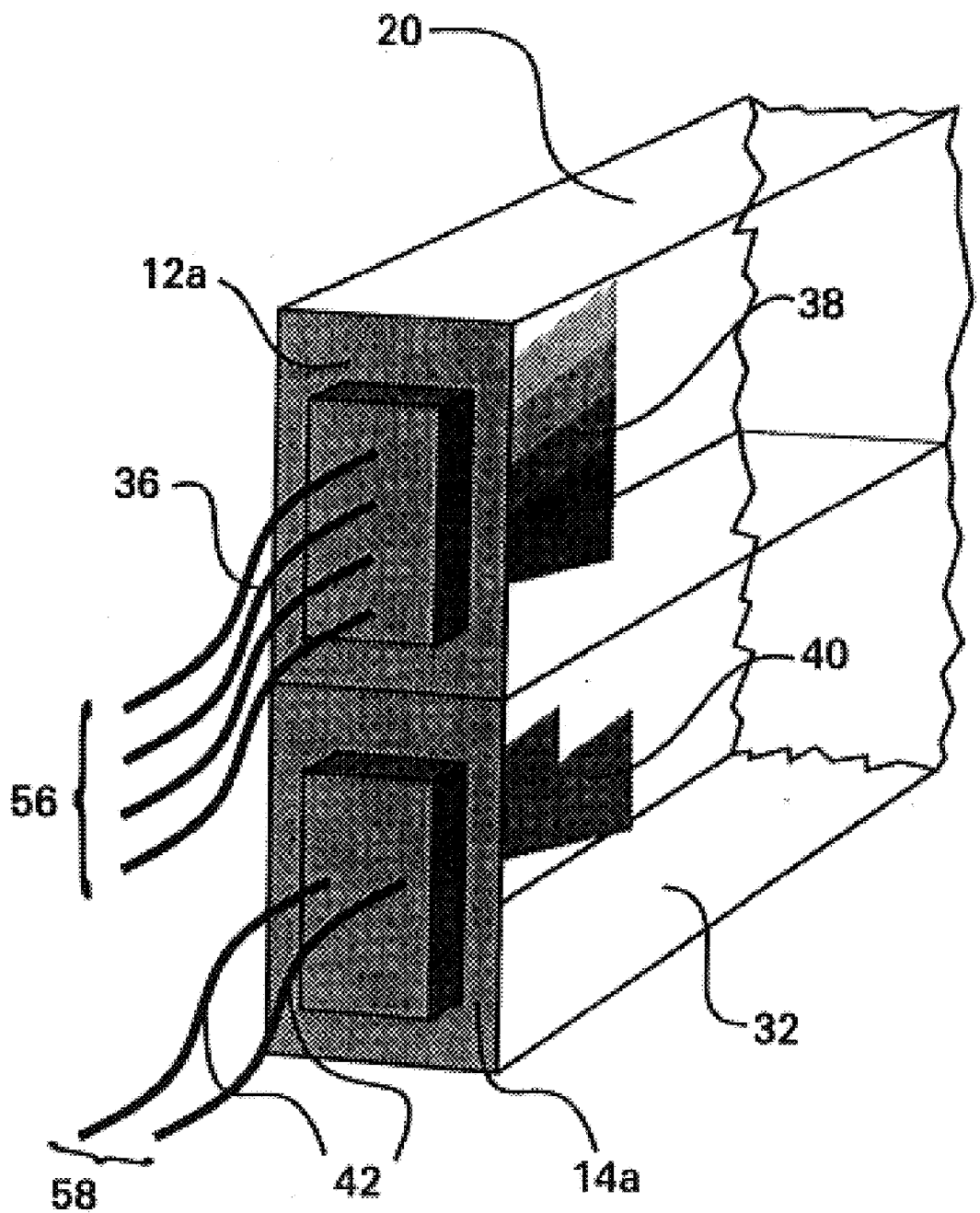
FIG. 10 is a perspective view of a portion of the device of FIG. 1, but including a one-dimensional array of input optical fibers and a one-dimensional array of output fibers that share the multiplexed device output from the single one-dimensional input array.

In the tenth embodiment, shown in FIG. 10, the wavelength division multiplexer is designed to input a one-dimensional array 57 of optical fibers 36 and provide a single output 58 at the output face 14a of the multiplexer that is shared by two or more output fibers 42. One implementation of the current embodiment is to design the collimating lens assemblies or utilize astigmatic light inputs from laser diodes such that two or more fibers receive the output light beam.

Figure 11A:
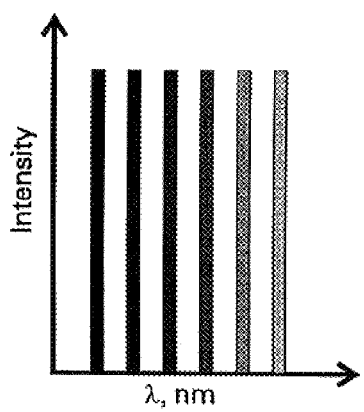
FIGS. 11a–11c are plots on coordinates of intensity and wavelength, depicting different intensity profiles for different configurations of the multiplexer of the present invention.
Figure 11B:
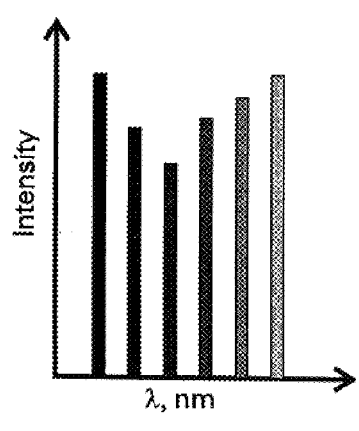
Figure 11C:
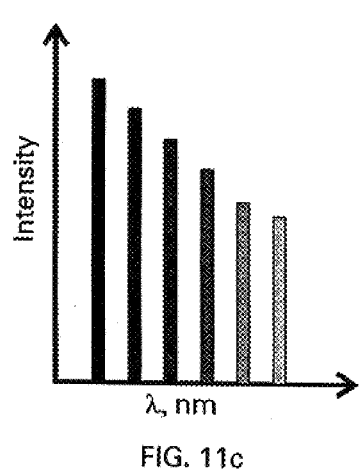

In the eleventh embodiment, the device of FIG. 1 may be specially designed and constructed such that individual wavelength channels in the polychromatic output beam are unevenly focused at the output face of the multiplexer. As graphically shown in FIG. 11a, the preferential embodiment of the device of FIG. 1 creates a very uniform plurality of focused beams that have uniform intensity distributions. However, the current embodiment alters the design of the collimating lens assemblies in order to incorporate a variation in intensity distributions as a function of increasing wavelength, such as shown in FIGS. 11b and 11c. These variations need not be linear but may be fairly complex and non-linear to match the non-uniform gain profiles of optical amplifiers, laser diode arrays, or other devices.

Figure 12:
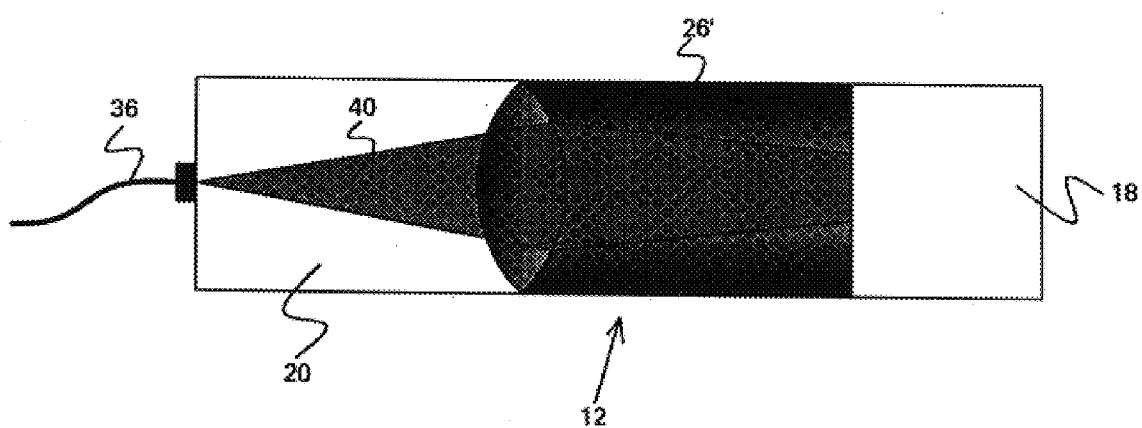
FIG. 12 is a top plan view of a device similar to the device of FIG. 1, but including a cylindrical gradient refractive index lens in place of the second homogeneous index boot lens.

In the twelfth embodiment, shown in FIG. 12, the wavelength division multiplexer is designed to input a one-dimensional array of optical fibers and again output to one or more output fibers. The current embodiment incorporates a cylindrical gradient refractive index lens in place of one of the homogeneous index boot lenses. In FIG. 12, the second homogeneous index boot lens 26 is replaced with a cylindrical gradient refractive index lens 26' to provide slight focusing of the light beam 38 along an axis parallel to direction of the refractive index gradient. The details of the cylindrical gradient refractive index lens have been disclosed elsewhere; see, e.g., U.S. Pat. No. 5,689,374, issued Nov. 18, 1997.

The cylindrical gradient refractive index lens 26' provides focusing of the output to a greater degree along the axis containing the refractive index gradient and no effect along the perpendicular axis. This enables the multiplexed light beams 38 to be normally focused along one axis while focused or de-focused along the other axis for the purpose of creating an output beam which is elliptical in cross-section. FIG. 10 depicts the input of one-dimension array 56 of optical fibers 36 and the output of two (or more) optical fibers 42, which is the arrangement of the device depicted in FIG. 12. By appropriately tailoring the focusing properties of the cylindrical gradient refractive index lens, it is possible to create two identical spots of equal shape and energy intensity. Alternately, the output beam may be simply elongated such that more than two output fibers receive relatively equal portions of the output beam. One application for using the cylindrical gradient refractive index lens 26' is to correct for magnification of one axis of the beam after transmitting through the diffraction grating 16'. In this case, the direction of the gradient in the cylindrical gradient refractive index lens 26' is perpendicular to the ruling direction of the diffraction grating 16'. Further, the cylindrical gradient refractive index lens 26' may also be used to compensate for uneven gain profiles observed in optical amplifier systems and laser diode arrays.

Further, an alternate embodiment (not shown) would be to replace the function of the cylindrical gradient refractive index lens with a conventional cylindrical lens, second diffraction grating, binary optic, or other microoptic to provide preferential focusing of one axis of the beam.

Figure 13:
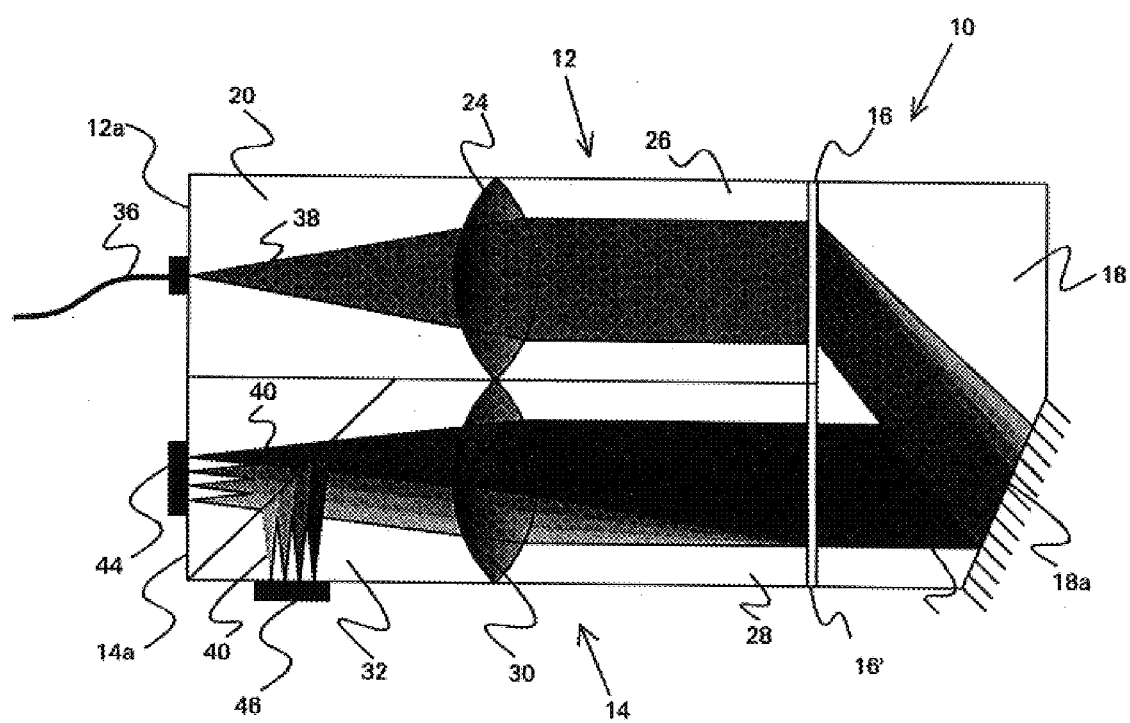
FIG. 13 is a view similar to the device of FIG. 1, but integrating a beamsplitter element such as a partial passive or electrooptically-controlled mirror into the fourth homogeneous index boot lens, wherein the beamsplitter creates a bi-directional WDM device that allows multiplexing from a laser diode array to an output optical fiber and demultiplexing from the same optical fiber to a photodiode array.

In the thirteenth embodiment, shown in FIG. 13, an integrated wavelength division multiplexer and demultiplexer is designed by integrating a mirror/beamsplitter element into one of the homogeneous index boot lenses. The integration of the beamsplitter creates a bi-directional, dual-use device particularly useful for the end nodes of optical networks where it is very highly desirable to have an integrated, bi-directional multiplexer and demultiplexer device.

As shown in FIG. 13, a partially transmissive, partially reflective mirror element 60 is inserted with the fourth homogeneous index boot lens 32. The plane of the beamsplitting element 60 is set at 45° from the plane of traditional exit face 14a of the device. The beamsplitting element 60 enables the symmetrical and opposite multiplexing and demultiplexing functions to be used in a single device. As a multiplexer, light 38 is initially incident on the traditional input face 12a of the device, similar to the device of FIG. 1. The plurality of input light beams subsequently pass through the beamsplitter 60 where reflection and transmission occurs. The transmitted light beams 40 are multiplexed as in the device of FIG. 1.

As a demultiplexer, an input light beam 40 that is input at the same position 44 as the multiplexer output beam is demultiplexed functionally in the same manner as described above with reference to FIG. 1 in the demultiplexer mode. However, the beamsplitter 60 located in the fourth homogeneous index boot lens 32 reflects light at a 90° angle away from the traditional output face 14a and into a photodetector array 46.

This mirror element 60 may be a metallic or similar type of passive mirror with a fixed ratio of transmission to reflection such as 50% reflecting and 50% transmission. Alternately, the beamsplitting device 60 may be an electrooptical device well known in the art such as a liquid crystal display (LCD) panel, electrochromic panel, or other similar material in which the amounts of transmission and reflection can be varied as a function of the power applied to the device. It is the preferred embodiment to integrate a switchable electrooptical beamsplitter 60 into the wavelength division multiplexer/demultiplexer device 10 to avoid the inherent 3-dB signal loss that occurs when using a 50% transmitting/50% reflecting mirror.

Figure 14:
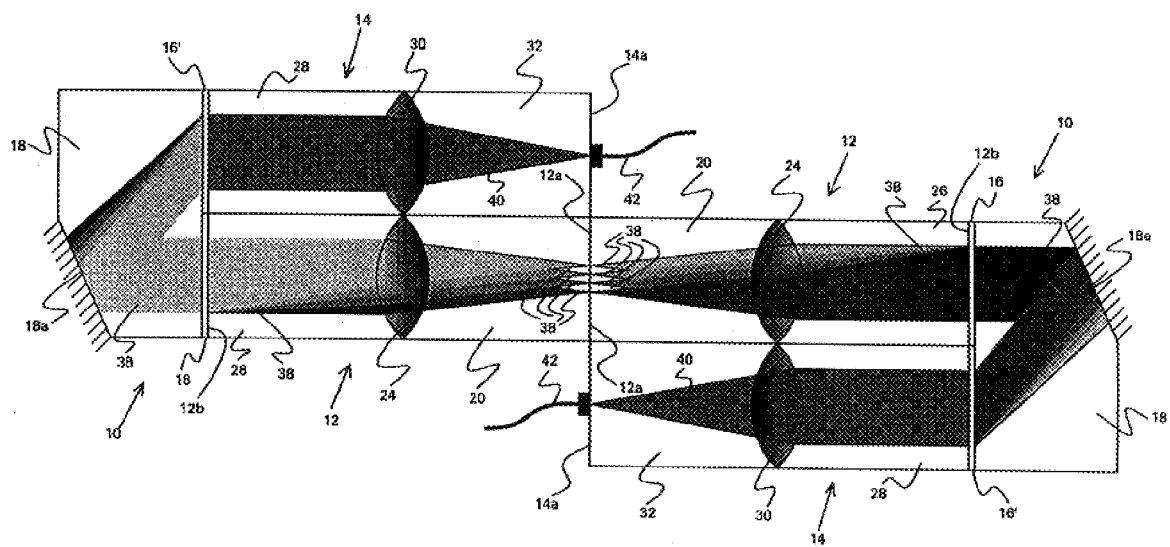
FIG. 14 is a view similar to the device of FIG. 1, but two multiplexers are placed in contact at their output faces, and in between the output faces is placed an array of optical switches or an array of electrooptical beamsteering material to provide switching or routing functions.

In the fourteenth embodiment, a customizable wavelength division router 100 may be created by placing two of the devices 10 shown in FIG. 1 together at their output faces 14a as shown in FIG. 14. At the point where the two devices are joined, an electrooptic mirror 62 containing individually addressable elements may be inserted to enable switching of individual wavelength channels. Alternately, an electrooptical beamsteering element may be used to provide beamsteering in a direction perpendicular to the colinear output array at the junction between the two devices.

Figure 15:
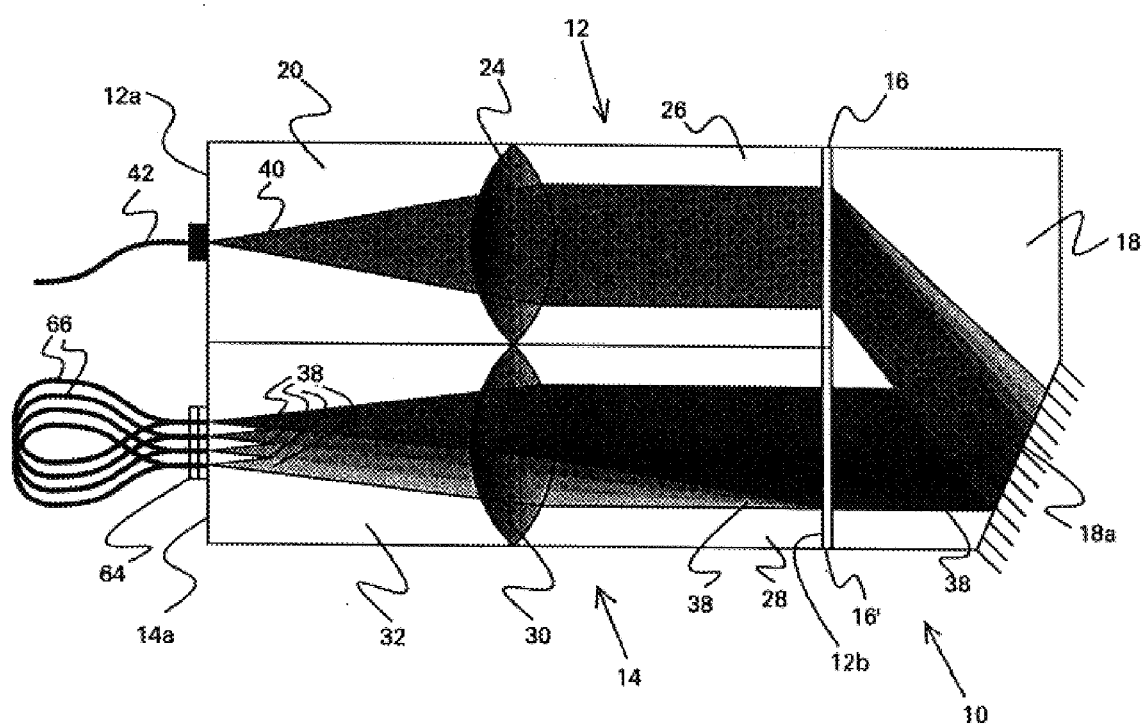
FIG. 15 is a view similar to the device of FIG. 1, but showing a 1×N blocking switch.
Figure 15A:
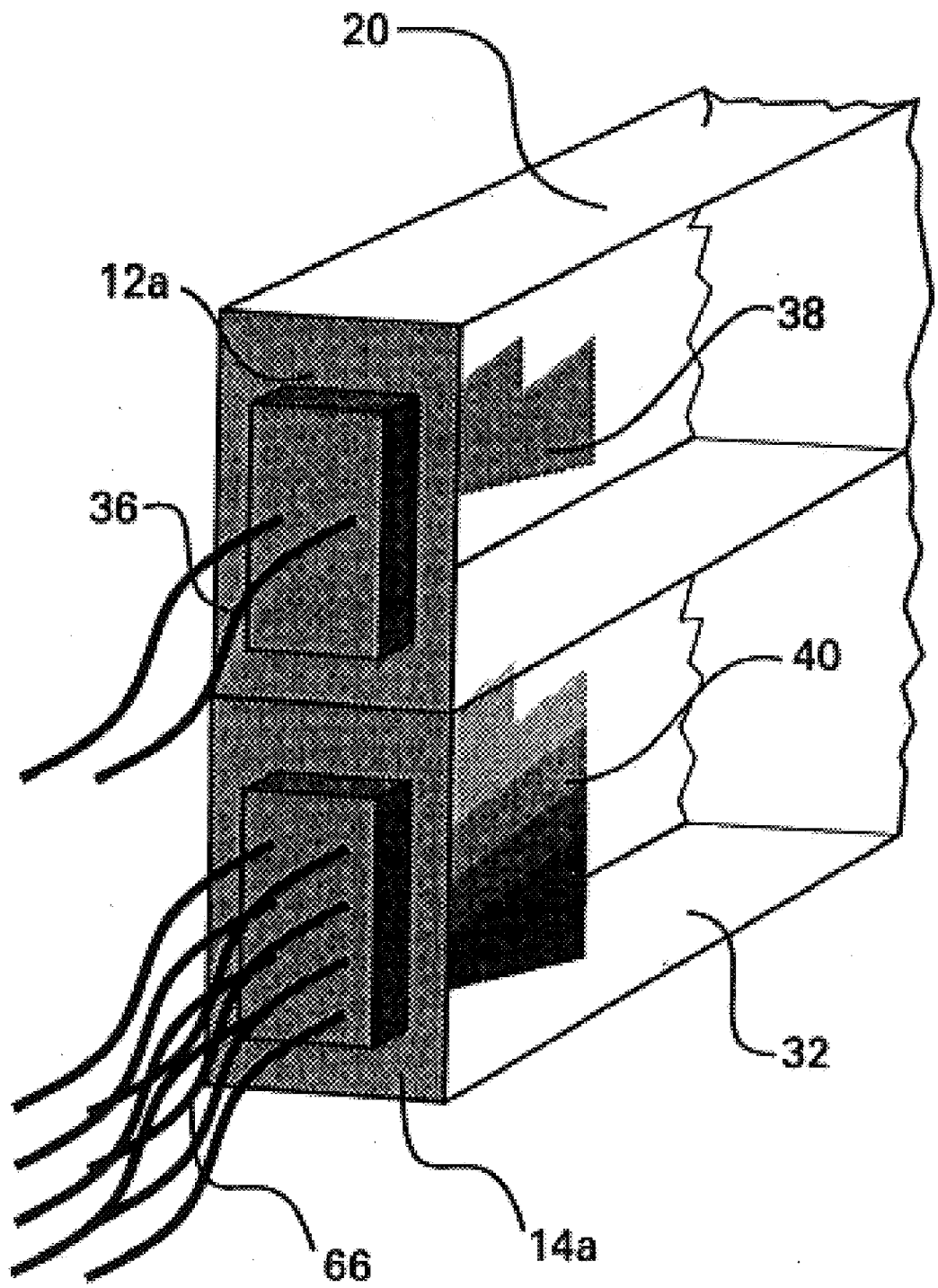
FIG. 15a is a perspective view of a portion of the device of FIG. 15, but including a co-linear array of input optical fibers and an array of optical fiber loops for interconnection pairs of outputs.

In the fifteenth embodiment, shown in FIG. 15, the wavelength division multiplexing device of FIG. 1 is used to create a 1×N blocking switch. The basic device of FIG. 1 is first used as a demultiplexer to separate a plurality of wavelengths that are present at the output face of the device. Attached to the output face 14a is first an array 64 of electrooptical blocking elements that are individually addressable (one element for each wavelength), which selectively block or unblock the passage of light. After the blocking array is located either Porro-type reflective prisms (not shown) or fiber loops 66 which take the individual outputs and reroute them to separate positions on the same output face 14a as multiplexer inputs. The inputs then pass through the device, are multiplexed, and are then output on the first input face 12a. This device provides a blocking function for each individual wavelength. FIG. 15a depicts the configuration of the input optical fibers 36 and output optical fibers loops 66.

INDUSTRIAL APPLICABILITY

The integrated axial gradient refractive index/diffraction grating wavelength division multiplexer/demultiplexer of the present invention is expected to find broad application in WDM-based network and communication systems.

Thus, there has been disclosed an integrated axial gradient refractive index/diffraction grating wavelength division multiplexer and demultiplexer. It will be readily apparent to those skilled in this are that various changes and modifications of an obvious nature may be made, and all such changes and modifications are considered to fall within the scope of the present invention, as defined by the appended claims.

What is claimed is:

1. An integrated axial gradient refractive index/diffraction grating wavelength division multiplexer device comprising:
    (a) an axial gradient refractive index collimating lens for collimating a plurality of monochromatic optical beams;
    (b) a homogeneous index boot lens affixed to the axial gradient refractive index collimating lens for transmitting the plurality of monochromatic optical beams from the axial gradient refractive index collimating lens, the homogeneous index boot lens having a planar exit surface; and
    (c) a transmissive diffraction grating formed at the planar exit surface of the homogeneous index boot lens for combining the plurality of monochromatic optical beams into a multiplexed, polychromatic optical beam.

2. The device of claim 1, wherein the homogeneous index boot lens is a first homogeneous index boot lens, the device further comprising:
    a second homogeneous index boot lens affixed to the axial gradient refractive index collimating lens for transmitting the plurality of monochromatic optical beams to the axial gradient refractive index collimating lens.

3. The device of claim 2, wherein the second homogeneous index boot lens has a planar entry surface for accepting the plurality of monochromatic optical beams from at least one optical source.

4. The device of claim 1, wherein the axial gradient refractive index collimating lens has a planar entry surface for accepting the plurality of monochromatic optical beams from at least one optical source.

5. The device of claim 1, further comprising:
    (d) a transmissive element associated with the transmissive diffraction grating, the transmissive element having at least one reflective surface for reflecting the multiplexed, polychromatic optical beam.

6. The device of claim 5, wherein the homogeneous index boot lens is a first homogeneous index boot lens, the device further comprising:
    (e) a second homogeneous index boot lens affixed to the transmissive element for transmitting the multiplexed, polychromatic optical beam from the transmissive element; and
    (f) an axial gradient refractive index focusing lens affixed to the second homogeneous index boot lens for focusing the multiplexed, polychromatic optical beam.

7. The device of claim 6, further comprising:
    a third homogeneous index boot lens affixed to the axial gradient refractive index focusing lens for transmitting the multiplexed, polychromatic optical beam from the axial gradient refractive index focusing lens.

8. The device of claim 7, wherein the third homogeneous index boot lens has a planar exit surface for outputting the multiplexed, polychromatic optical beam to at least one optical receiver.

9. The device of claim 6, wherein the axial gradient refractive index focusing lens has a planar exit surface for outputting the multiplexed, polychromatic optical beam to at least one optical receiver.

10. The device of claim 5, further comprising:
(e) a cylindrical gradient refractive index lens affixed to the transmissive element for transmitting the multiplexed, polychromatic optical beam from the transmissive element; and
(f) an axial gradient refractive index focusing lens affixed to the cylindrical gradient refractive index lens for focusing the multiplexed, polychromatic optical beam.

11. An integrated axial gradient refractive index/ diffraction grating wavelength division multiplexer device comprising:
(a) an axial gradient refractive index focusing lens for focusing a multiplexed, polychromatic optical beam;
(b) a homogeneous index boot lens affixed to the axial gradient refractive index focusing lens for transmitting the multiplexed, polychromatic optical beam to the axial gradient refractive index focusing lens, the homogeneous index boot lens having a planar entry surface; and
(c) a transmissive diffraction grating formed at the planar entry surface of the homogeneous index boot lens for combining a plurality of incident monochromatic optical beams into the multiplexed, polychromatic optical beam.

12. The device of claim 11, further comprising:
(d) a transmissive element associated with the transmissive diffraction grating, the transmissive element having at least one reflective surface for reflecting the plurality of monochromatic optical beams toward the transmissive diffraction grating.

13. The device of claim 12, wherein the homogeneous index boot lens is a first homogeneous index boot lens, the device further comprising:
(e) a second homogeneous index boot lens affixed to the transmissive element for transmitting the plurality of monochromatic optical beams to the transmissive element; and
(f) an axial gradient refractive index collimating lens affixed to the second homogeneous index boot lens for collimating the plurality of monochromatic optical beams.

14. An integrated axial gradient refractive index/ diffraction grating wavelength division demultiplexer device comprising:
(a) an axial gradient refractive index collimating lens for collimating a multiplexed, polychromatic optical beam;
(b) a homogeneous index boot lens affixed to the axial gradient refractive index collimating lens for transmitting the multiplexed, polychromatic optical beam from the axial gradient refractive index collimating lens, the homogeneous index boot lens having a planar exit surface; and
(c) a transmissive diffraction grating formed at the planar exit surface of the homogeneous index boot lens for separating the multiplexed, polychromatic optical beam into a plurality of monochromatic optical beams.

15. The device of claim 14, wherein the homogeneous index boot lens is a first homogeneous index boot lens, the device further comprising:
a second homogeneous index boot lens affixed to the axial gradient refractive index collimating lens for transmitting the multiplexed, polychromatic optical beam to the axial gradient refractive index collimating lens.

16. The device of claim 15, wherein the second homogeneous index boot lens has a planar entry surface for accepting the multiplexed, polychromatic optical beam from at least one optical source.

17. The device of claim 14, wherein the axial gradient refractive index collimating lens has a planar entry surface for accepting the multiplexed, polychromatic optical beam from at least one optical source.

18. The device of claim 14, further comprising:
(d) a transmissive element associated with the transmissive diffraction grating, the transmissive element having at least one reflective surface for reflecting the plurality of monochromatic optical beams.

19. The device of claim 18, wherein the homogeneous index boot lens is a first homogeneous index boot lens, the device further comprising:
(e) a second homogeneous index boot lens affixed to the transmissive element for transmitting the plurality of monochromatic optical beams from the transmissive element; and
(f) an axial gradient refractive index focusing lens affixed to the second homogeneous index boot lens for focusing the plurality of monochromatic optical beams.

20. The device of claim 19, further comprising:
a third homogeneous index boot lens affixed to the axial gradient refractive index focusing lens for transmitting the plurality of monochromatic optical beams from the axial gradient refractive index focusing lens.

21. The device of claim 20, wherein the third homogeneous index boot lens has a planar exit surface for outputting the plurality of monochromatic optical beams to at least one optical receiver.

22. The device of claim 19, wherein the axial gradient refractive index focusing lens has a planar exit surface for outputting the plurality of monochromatic optical beams to at least one optical receiver.

23. The device of claim 18, further comprising:
(e) a cylindrical gradient refractive index lens affixed to the transmissive element for transmitting the plurality of monochromatic optical beams from the transmissive element; and
(f) an axial gradient refractive index focusing lens affixed to the cylindrical gradient refractive index lens for focusing the plurality of monochromatic optical beams.

24. An integrated axial gradient refractive index/ diffraction grating wavelength division demultiplexer device comprising:
(a) an axial gradient refractive index focusing lens for focusing a plurality of incident monochromatic optical beams;
(b) a homogeneous index boot lens affixed to the axial gradient refractive index focusing lens for transmitting the plurality of incident monochromatic optical beams to the axial gradient refractive index focusing lens, the homogeneous index boot lens having a planar entry surface; and
(c) a transmissive diffraction grating formed at the planar entry surface of the homogeneous index boot lens for separating an incident multiplexed, polychromatic optical beam into the plurality of incident monochromatic optical beams.

25. The device of claim 24, further comprising:
(d) a transmissive element associated with the transmissive diffraction grating, the transmissive element having at least one reflective surface for reflecting the multiplexed, polychromatic optical beam toward the transmissive diffraction grating.

26. The device of claim 25, wherein the homogeneous index boot lens is a first homogeneous index boot lens, the device further comprising:
- (e) a second homogeneous index boot lens affixed to the transmissive element for transmitting the multiplexed, polychromatic optical beam to the transmissive element; and
- (f) an axial gradient refractive index collimating lens affixed to the second homogeneous index boot lens for collimating the multiplexed, polychromatic optical beam.

27. An integrated axial gradient refractive index/diffraction grating wavelength division multiplexer device comprising:
- (a) an axial gradient refractive index collimating lens for collimating a plurality of monochromatic optical beams;
- (b) a homogeneous index boot lens affixed to the axial gradient refractive index collimating lens for transmitting the plurality of monochromatic optical beams from the axial gradient refractive index collimating lens; and
- (c) a transmissive element affixed to the homogeneous index boot lens, the transmissive element having a reflective diffraction grating for combining the plurality of monochromatic optical beams into a multiplexed, polychromatic optical beam, and for reflecting the multiplexed, polychromatic optical beam.

28. The device of claim 27, wherein the homogeneous index boot lens is a first homogeneous index boot lens, the device further comprising:
- (d) a second homogeneous index boot lens affixed to the transmissive element for transmitting the multiplexed, polychromatic optical beam from the transmissive element; and
- (e) an axial gradient refractive index focusing lens affixed to the second homogeneous index boot lens for focusing the multiplexed, polychromatic optical beam.

29. An integrated axial gradient refractive index/diffraction grating wavelength division demultiplexer device comprising:
- (a) an axial gradient refractive index collimating lens for collimating a multiplexed, polychromatic optical beam;
- (b) a homogeneous index boot lens affixed to the axial gradient refractive index collimating lens for transmitting the multiplexed, polychromatic optical beam from the axial gradient refractive index collimating lens; and
- (c) a transmissive element affixed to the homogeneous index boot lens, the transmissive element having a reflective diffraction grating for separating the multiplexed, polychromatic optical beam into a plurality of monochromatic optical beams, and for reflecting the plurality of monochromatic optical beams.

30. The device of claim 29, wherein the homogeneous index boot lens is a first homogeneous index boot lens, the device further comprising:
- (d) a second homogeneous index boot lens affixed to the transmissive element for transmitting the plurality of monochromatic optical beams from the transmissive element; and
- (e) an axial gradient refractive index focusing lens affixed to the second homogeneous index boot lens for focusing the plurality of monochromatic optical beams.

\* \* \* \* \*

UNITED STATES PATENT AND TRADEMARK OFFICE
CERTIFICATE OF CORRECTION

PATENT NO. : 6,137,933
DATED : October 24, 2000
INVENTOR(S) : Boyd V. Hunter et al.

It is certified that error appears in the above-identified patent and that said Letters Patent is hereby corrected as shown below:

Title page,
Item [75], delete "Ray T. Chen, Austin, TX".

Signed and Sealed this

First Day of January, 2002

Attest:

JAMES E. ROGAN
*Director of the United States Patent and Trademark Office*

*Attesting Officer*